(12) United States Patent
Onishi

(10) Patent No.: US 8,544,762 B1
(45) Date of Patent: Oct. 1, 2013

(54) THERMO-ELEMENT AND THERMOSTAT

(75) Inventor: Yukio Onishi, Ishigaki (JP)

(73) Assignee: Yukio Onishi, Ishigaki-shi, Okinawa (JP)

( * ) Notice: Subject to any disclaimer, the term of this patent is extended or adjusted under 35 U.S.C. 154(b) by 0 days.

(21) Appl. No.: 13/618,559

(22) Filed: Sep. 14, 2012

(30) Foreign Application Priority Data

Apr. 5, 2012 (JP) ................................. 2012-086054

(51) Int. Cl.
G05D 23/12 (2006.01)
G05D 23/02 (2006.01)

(52) U.S. Cl.
USPC .......... 236/100; 236/54; 236/93 A; 236/99 R; 236/99 K

(58) Field of Classification Search
USPC .................. 236/54, 56, 59, 92 B, 93 A, 99 R, 236/100, 99 F, 99 K
See application file for complete search history.

(56) References Cited

U.S. PATENT DOCUMENTS

| | | | | |
|---|---|---|---|---|
| 2,368,181 A | * | 1/1945 | Vernet | 60/527 |
| 2,694,415 A | * | 11/1954 | Dillon | 92/101 |
| 3,427,883 A | * | 2/1969 | Kuze | 60/527 |
| 3,591,075 A | * | 7/1971 | Onishi | 236/34 |
| 5,228,619 A | * | 7/1993 | Yano et al. | 236/92 B |
| 5,251,459 A | * | 10/1993 | Grass et al. | 62/324.1 |
| 6,817,540 B2 | * | 11/2004 | Suda et al. | 236/99 K |
| 2008/0251591 A1 | * | 10/2008 | Miyamoto et al. | 236/99 K |

FOREIGN PATENT DOCUMENTS

| | | | |
|---|---|---|---|
| JP | 58-016003 | Y2 | 7/1980 |
| JP | 06-043591 | Y2 | 6/1989 |
| JP | 07-098390 | A | 4/1995 |
| JP | 11-293235 | A | 10/1999 |

* cited by examiner

Primary Examiner — Marc Norman
Assistant Examiner — Paolo Gonzalez
(74) Attorney, Agent, or Firm — Brinks Hofer Gilson & Lione

(57) ABSTRACT

A thermo-element having an excellent response and durability is provided. The thermo-element includes a casing having a bottom, a thermally expandable material filled in the casing and capable of expanding and contracting due to temperature changes, a piston movable in an axial direction thereof, a guide member for slidably holding the piston, and a liquid chamber defined between the thermally expandable material and the piston to receive therein a deformable, incompressible fluid. A check valve is provided between the liquid chamber and an outside of the thermo-element, and operable to permit a flow of the fluid in a direction from the outside of the thermo-element to the liquid chamber, and inhibit a flow of the fluid in a direction from the liquid chamber to the outside of the thermo-element.

8 Claims, 7 Drawing Sheets

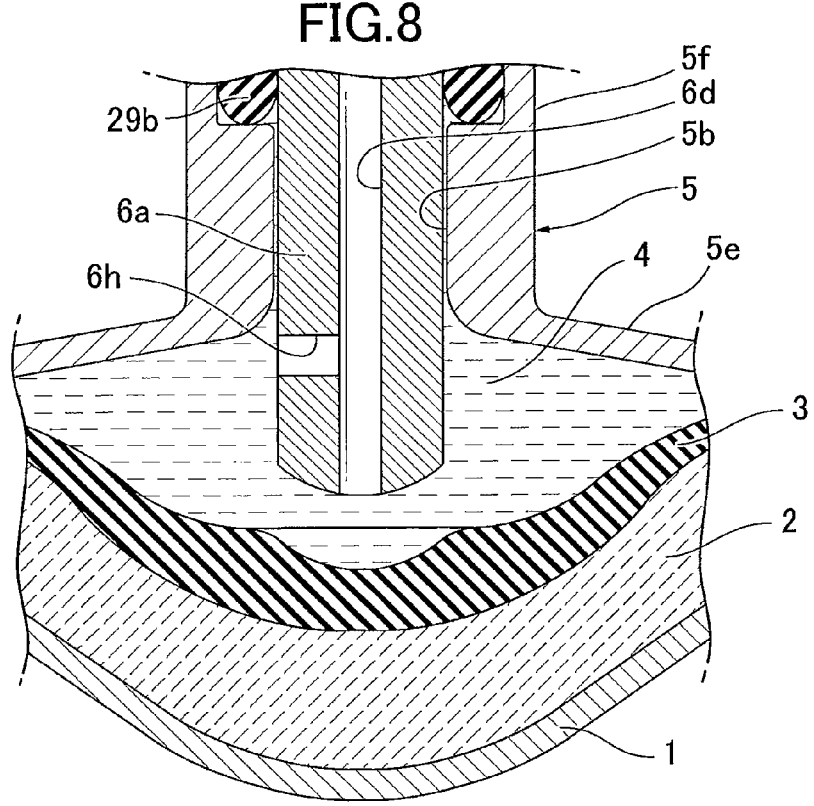
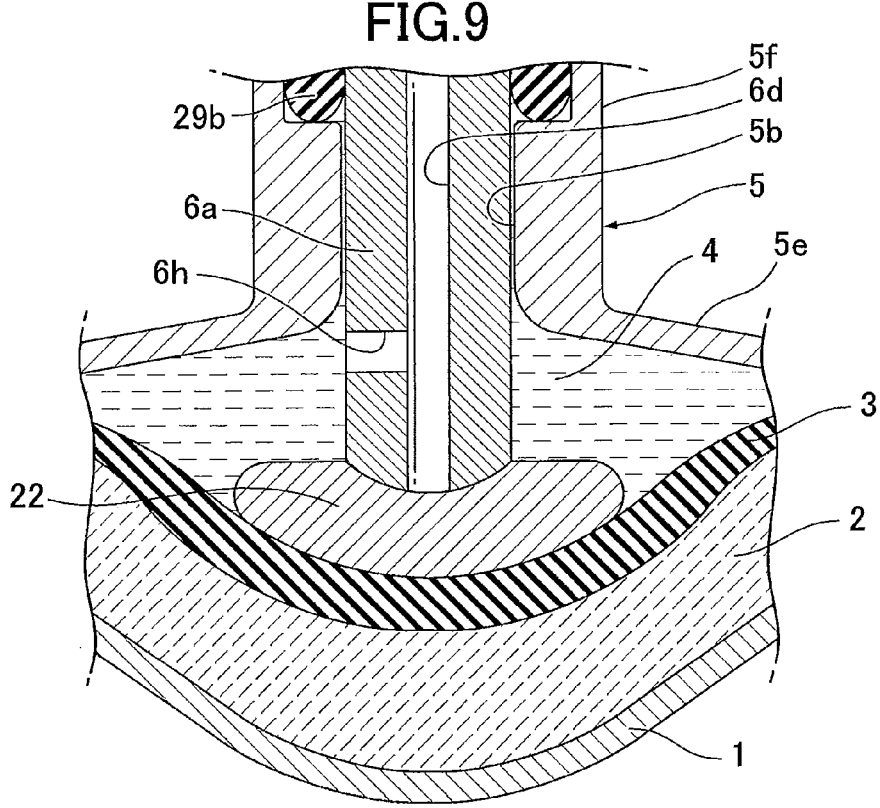

THERMO-ELEMENT AND THERMOSTAT

RELATED APPLICATIONS

This application claims priority under 35 U.S.C. §119 to Japanese Patent Application No. 2012-086054 filed on Apr. 5, 2012, the entire content of which is hereby incorporated by reference.

TECHNICAL FIELD

The present invention relates to a thermo-element which is a thermo-actuator utilizing expansion and contraction of paraffin due to temperature changes, and a thermostat using the thermo-element.

BACKGROUND ART

Heretofore, a thermo-element using a thermally expandable material, such as paraffin, as a temperature sensor, has been employed in various devices. The thermo-element is operable to convert a change in volume of paraffin due to a thermally-caused phase change thereof to a linear movement of a piston in an axial direction thereof. The thermo-element includes a diaphragm type as illustrated in FIG. 1, and other types, such as a sleeve type and a thick sealing member type (not illustrated). The diaphragm type thermo-element is configured such that a thermally expandable material (paraffin) is hermetically sealed by an elastic sealing member, and a piston is pushed out by the elastic sealing member through an incompressible fluid. Each of the sleeve type and the thick sealing member type thermo-elements is configured such that a thermally expandable material (paraffin) is hermetically sealed by an elastic sealing member, and a piston is pushed out directly by the elastic sealing member.

In a diaphragm type thermo-element illustrated in FIG. 1, a cylindrical-shaped guide member 5 is fixed to a bottomed cylindrical-shaped casing 1. A thermally expandable material 2 is filled in the casing 1, and an upper end surface of the thermally expandable material 2 is sealed up by a diaphragm 3 serving as an elastic sealing member. A liquid chamber 4 is provided between a contact surface 5a which is an inner surface of a base end portion of the guide member 5, and an upper surface of the diaphragm 3, and filled with a gum-like fluid composed of a deformable, incompressible fluid. A rubber piston 7, a protection plate 8 and a piston 6 are provided inside a sliding hole 5b of the guide member 5 and above the liquid chamber 4 in this order. An upper portion of the piston 6 protrudes upwardly from the sliding hole 5b.

Upon an increase in ambient temperature, the thermally expandable material 2 expands, so that the diaphragm 3 is raised upwardly to push up the gum-like fluid enclosed in the liquid chamber 4 above the diaphragm 3. Then, the gum-like fluid is deformed to enter the sliding hole 5b and push the piston 6 upwardly through the rubber piston 7 and the protection plate 8. Subsequently, upon a decrease in ambient temperature, the thermally expandable material 2 contracts, so that the piston 6 is pushed down by a load (not illustrated) applied thereto. In this way, the piston 6 is relatively moved with respect to the guide member 5 in an up and down direction, in response to temperature changes.

However, the diaphragm type thermo-element has a problem that the incompressible fluid is liable to leak, due to its structural complexity. Even in the sleeve type thermo-element, the same problem occurs when it has a structure employing an incompressible fluid.

In the case of sealing a device which employs a commonly-used fluid, an O-ring or V-ring is used, and grease is applied to a sliding surface in contact with the O-ring or the like to reduce sliding resistance. The device is operated while supplying supplementary grease, because grease leakage inevitably occurs. However, a commonly-used O-ring or the like cannot be used in the thermo-element, because, if grease leakage occurs, a volume of the incompressible fluid is changed, which exerts an influence on an amount of movement of the piston.

For this reason, in the diaphragm type thermo-element, the thermally expandable material is isolated by a diaphragm, and a gum-like fluid free of liquefaction and less likely to leak is used as the incompressible fluid. Further, a rubber piston having excellent sealing performance is used as a sealing member, instead of an O-ring.

The gum-like fluid is intended to transfer expansion of the thermally expandable material to the piston, by using a material less likely to leak, so that it has poor fluidity as compared to liquid. Thus, a shape of the liquid chamber 4 for enclosing the gum-like fluid therein is restricted to a simple shape.

As a countermeasure against leakage of the gum-like fluid, studies have heretofore been made, for example, of view such as a structure of the thermo-element and a material for the gum-like fluid.

JP 3225386 relates to an improvement in structure of the diaphragm type thermo-element, and discloses a structure in which a piston is inserted in a gum-like fluid composed of an incompressible fluid, and a gap between a guide member and the piston is hermetically sealed by a packing, thereby allowing for elimination of a rubber piston and a protection plate.

JP U58-016003 B (Japanese Utility Model Publication) relates to an improvement of the sleeve type thermo-element, and discloses a structure in which a sealed chamber is defined between a sleeve and a piston, and filled with an incompressible fluid, wherein the sleeve is adapted to push up the piston through the incompressible fluid.

In the Patent JP 3225386 and JP U58-016003 B (Japanese Utility Model Publication), however, a problem of leakage of the gum-like fluid composed of an incompressible fluid still remains, and each of the thermo-elements becomes structurally more complex.

Patent JP U06-043591 (Japanese Utility Model Publication) relates to an improvement in the material of a gum-like fluid composed of an incompressible fluid, and discloses a gum-like fluid formed as a semifluid by finely crushing synthetic gum, mixing the resulting crushed gum pieces with a lubricant such as grease or oil, and kneading them. However, this semifluid is likely to give rise to a phenomenon leading to a locked state, such as blocking caused by the crushed gum pieces.

JP 11-293235 A discloses that paraffin as the thermally expandable material is absorbed in carbon black particles and prepared in a powder form to reduce the risk of leakage of the paraffin, and that a piston is directly inserted in the thermally expandable material and adapted to be pushed up directly by the thermally expandable material due to a change in volume of the thermally expandable material. In the Patent Document 4, the paraffin absorbed in the carbon black particles is prepared in a powder form. Thus, an operation of the thermo-element is liable to become unstable, although the paraffin is sealed by a sealing member.

As stated above, in a thermo-element adapted to move out a piston through an incompressible fluid according to expansion and contraction of a thermally expandable material, irrespective of whether it is the diaphragm type or the sleeve type, the problem of how to prevent leakage of the incompressible fluid (gum-like fluid) has not yet been sufficiently solved.

Therefore, there is a need for a thermo-element capable of stably operating without the occurring of the problem of leakage of an incompressible fluid and with small sliding resistance of a piston.

There is another need for a thermo-element having excellent durability.

There is yet another need for a thermo-element having fewer restrictions on shape.

There is still another need for a thermostat using such a thermo-element.

SUMMARY OF THE INVENTION

It is an object of the present invention to provide a thermo-element capable of stably operating without occurring of the problem of leakage of an incompressible fluid and with small sliding resistance of a piston.

It is another object of the present invention to provide a thermo-element having excellent durability.

It is yet another object of the present invention to provide a thermo-element having fewer restrictions on shape.

It is still another object of the present invention to provide a thermostat using such a thermo-element.

In the present invention, a check valve is provided inside a piston to permit a liquid flow in a direction from an outside of a thermo-element to a liquid chamber inside the thermo-element, and inhibit a liquid flow in the opposite direction.

In accordance with one aspect of the present invention, there is provided a thermo-element which comprises: a casing having a bottom; a thermally expandable material filled in the casing, wherein the thermally expandable material includes paraffin capable of expanding and contracting due to temperature changes; an elastic sealing member sealingly enclosing the thermally expandable material in the casing; a piston movable in an axial direction thereof; a guide member fixed to an upper portion of the casing and formed with a sliding hole for slidably holding the piston; a liquid chamber defined internally by the elastic sealing member, the guide member and the piston; and a deformable, incompressible fluid received in the liquid chamber, wherein the piston is adapted to be moved along the sliding hole of the guide member in the axial direction, according to expansion and contraction of the thermally expandable material and through the incompressible fluid in the liquid chamber.

The thermo-element is characterized in that the piston is internally formed with: a through-hole communicating with the liquid chamber; a check-valve chamber communicating with the through-hole and receiving therein a check-valve element of a check valve; and a communication hole communicating with the check-valve chamber and having an opening exposed to an outside of the thermo-element.

In the thermo-element of the present invention, the fluid in the liquid chamber may be the same liquid as that outside or surrounding the thermo-element. It is possible to use an O-ring for sealing, as there is no need for strict sealing using a rubber piston and a protection plate, so that the piston can be slidingly moved smoothly.

The liquid surrounding the thermo-element has better fluidity than that of a gum-like fluid. In cases where oil or the like is used as a fluid in the liquid chamber, it has fluidity better than that of a gum-like fluid. The oil is a low-viscosity oil having lubricating properties, such as engine oil or silicone oil. Thus, it becomes possible to ease restrictions on a shape of the liquid chamber, thereby allowing for use of a large-diameter casing.

The check valve is operable to permit a flow of the incompressible fluid in a direction from the communication hole to the liquid chamber, and inhibit a flow of the incompressible fluid in a direction from the liquid chamber to the communication hole. The check valve is provided in the piston. Thus, when the fluid in the liquid chamber decreases, the check valve is opened so as to automatically supply supplementary fluid.

Preferably, in the thermo-element of the present invention, the piston has a piston body and a piston cover disposed at one end of the piston body, wherein the check-valve chamber is defined between the piston body and the piston cover.

This makes it possible to form the check-valve chamber inside the piston, and install the check-valve element therein.

Preferably, in the thermo-element of the present invention, the check-valve element in the check-valve chamber is pressed against a check-valve seat formed on an inner surface of the piston cover, by a check-valve spring.

This makes it possible for the check valve to reliably operate.

Preferably, the thermo-element of the present invention further comprises a protection plate disposed between a lower end portion of the piston and an upper surface of a central portion of the elastic sealing member to protect it against the lower end portion of the piston.

The protection plate prevents the elastic sealing member such as a diaphragm from being abnormally bent by the lower end portion of the piston.

Preferably, the thermo-element of the present invention further comprises a hermetic liquid space defined between an outer peripheral surface of the piston and an inner peripheral surface of the guide member, wherein the liquid space communicates with the liquid chamber via the through-hole of the piston, whereby the incompressible fluid in the liquid chamber can flow into and out of the liquid space according to expansion and contraction of the thermally expandable material.

Instead of a gum-like fluid, fluid having excellent fluidity is used as the incompressible fluid. Thus, when the thermally expandable material expands, the incompressible fluid in the liquid chamber flows into the liquid space to push up the piston. Thus, an area for pushing the piston becomes larger, so that it becomes possible to push up the piston by a stronger force.

When the thermally expandable material contracts, the incompressible fluid is returned from the liquid space to the liquid chamber, and the piston is returned downwardly. Therefore, an operation of the thermo-element becomes stable.

Preferably, in the above thermo-element, the liquid space is hermetically held by O-rings disposed between the outer peripheral surface of the piston and the inner peripheral surface of the guide member.

In accordance with another aspect of the present invention, there is provided a thermostat which comprises: a thermo-element having a casing having a bottom, a thermally expandable material filled in the casing and including paraffin capable of expanding and contracting due to temperature changes, an elastic sealing member sealingly enclosing the thermally expandable material in the casing, a piston movable in an axial direction thereof, a guide member fixed to an upper portion of the casing, and a deformable, incompressible fluid received in a liquid chamber defined internally by the elastic sealing member, the guide member and the piston, wherein the guide member has a guide tube portion formed with a sliding hole for slidably holding the piston, a large-diameter portion formed below the guide tube portion to have an outer diameter greater than that of the guide tube portion, and a control-valve element formed by an outer periphery of the large-diameter portion;

a lower frame for receiving therein the thermo-element, wherein the lower frame is formed with a flow passage for allowing liquid to pass therethrough;

an upper frame fixed to the lower frame and formed with a flow passage for allowing the liquid to pass therethrough, wherein the upper frame has a top portion in contact with an upper end portion of the piston, and a control-valve seat adapted to come into contact with the control-valve element of the thermo-element; and a control-valve spring for pressing the control-valve element of the thermo-element against the control-valve seat of the upper frame, wherein the piston is adapted to be relatively moved with respect to the guide member in the axial direction along the sliding hole, according to expansion and contraction of the thermally expandable material and through the incompressible fluid in the liquid chamber, so that a distal end of the upper end portion of the piston pushes up an upper portion of the upper frame in relative relation with respect to the guide member, thereby opening the control-valve element, and wherein the piston is internally formed with: a through-hole communicating with the liquid chamber; a check-valve chamber communicating with the through-hole and receiving therein a check-valve element of a check valve; and a communication hole communicating with the check-valve chamber and having an opening exposed to an outside of the thermo-element, and wherein the check valve is operable to permit a flow of the incompressible fluid in a direction from the communication hole to the liquid chamber, and inhibit a flow of the incompressible fluid in a direction from the liquid chamber to the communication hole.

Preferably, in the thermostat of the present invention, the large-diameter portion of the guide member has an outer edge region which is bent downwardly and then further bent inwardly so as to hermetically seal between the casing and the elastic sealing member through a washer.

This makes it possible to prevent the thermally expandable material between the casing and the elastic sealing member and the fluid in the liquid chamber from leaking.

The present invention can provide a thermo-element capable of stably operating without occurring of the problem of leakage of an incompressible fluid and with small sliding resistance of a piston.

Further, the present invention can provide a thermo-element having excellent durability.

Further, the present invention can provide a thermo-element having fewer restrictions on shape.

Further, the present invention can provide a thermostat using such a thermo-element.

BRIEF DESCRIPTION OF THE DRAWINGS

FIG. 8 is an enlarged sectional view of a lower portion of the piston and a part of the diaphragm, in the thermo-element illustrated in FIG. 2.

FIG. 9 is an enlarged sectional view of a lower portion of a piston and a part of a diaphragm, in a thermo-element according to a second embodiment of the present invention, wherein a diaphragm protection plate is provided.

DETAILED DESCRIPTION OF THE PREFERRED EMBODIMENTS

With reference to the drawings, the present invention will now be described based on an embodiment thereof.

Figure 1:
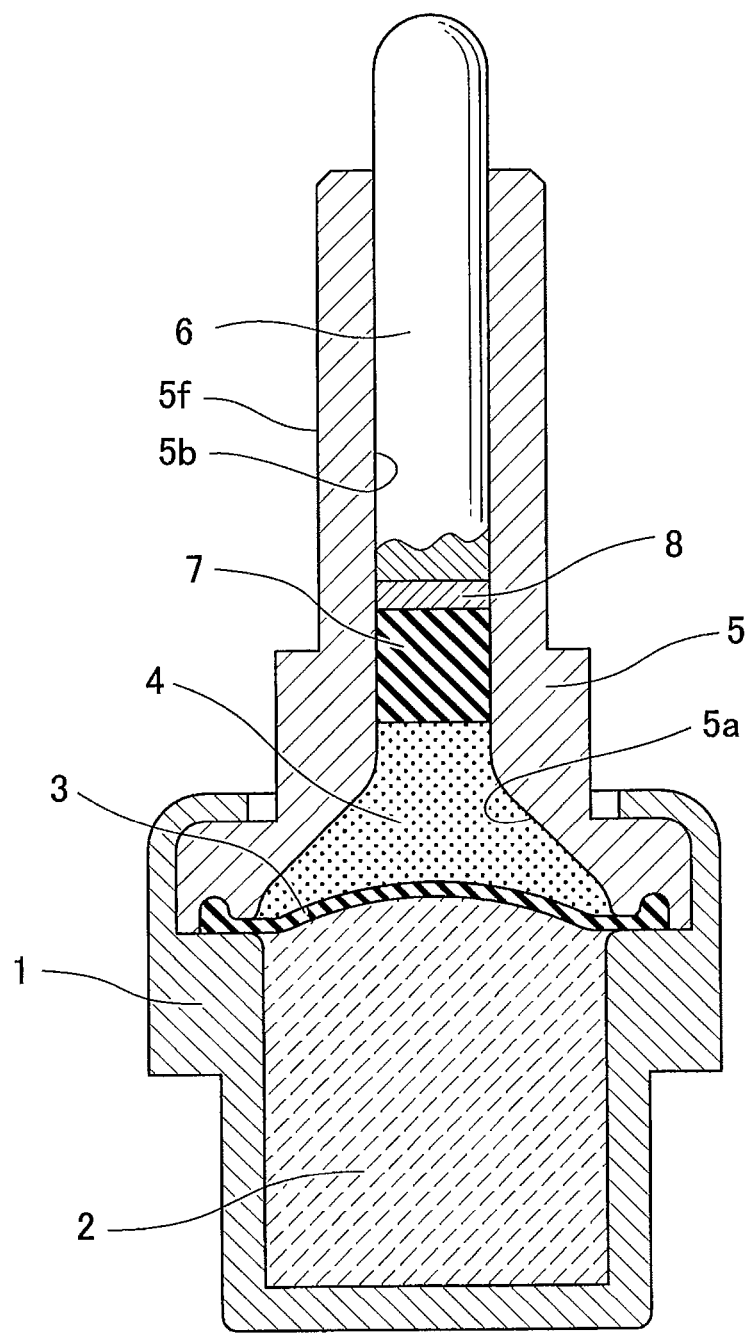
FIG. 1 is a vertical sectional view of a conventional diaphragm type thermo-element.
Figure 2:
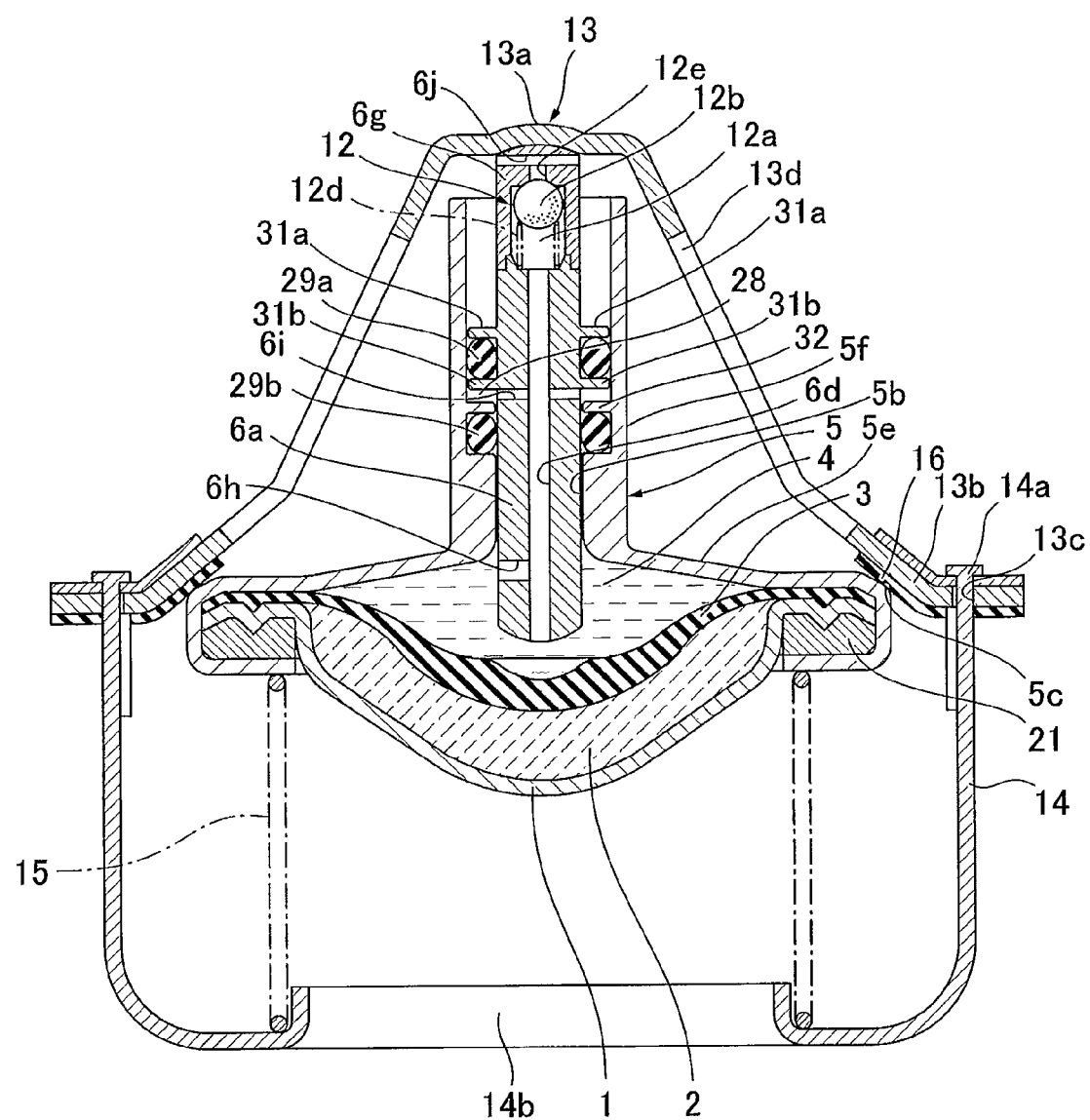
FIG. 2 is a vertical sectional view of a thermostat using a thermo-element according to a first embodiment of the present invention.
Figure 3:
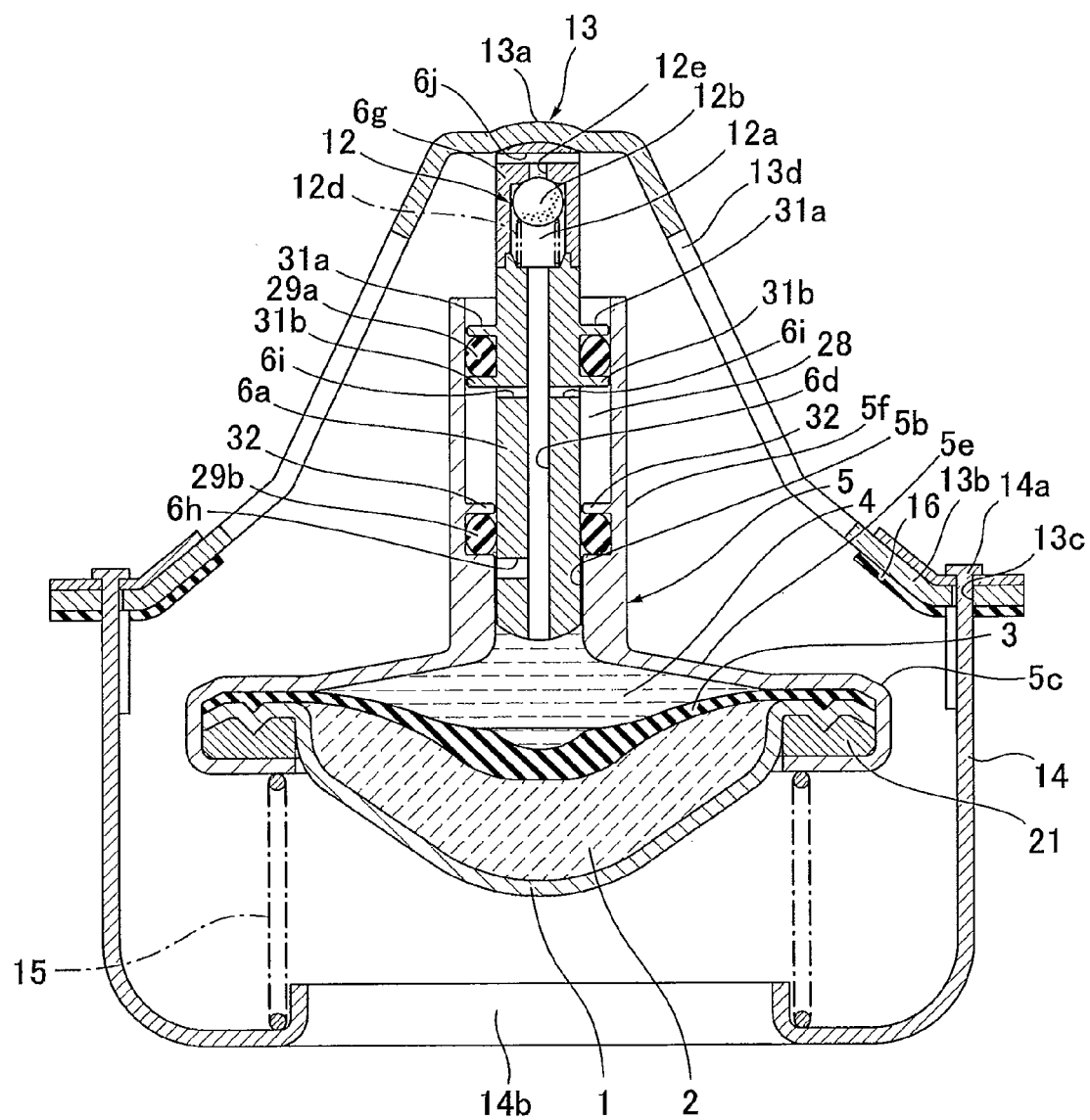
FIG. 3 is a vertical sectional view of the thermostat illustrated in FIG. 2, under high ambient temperatures.
Figure 4:
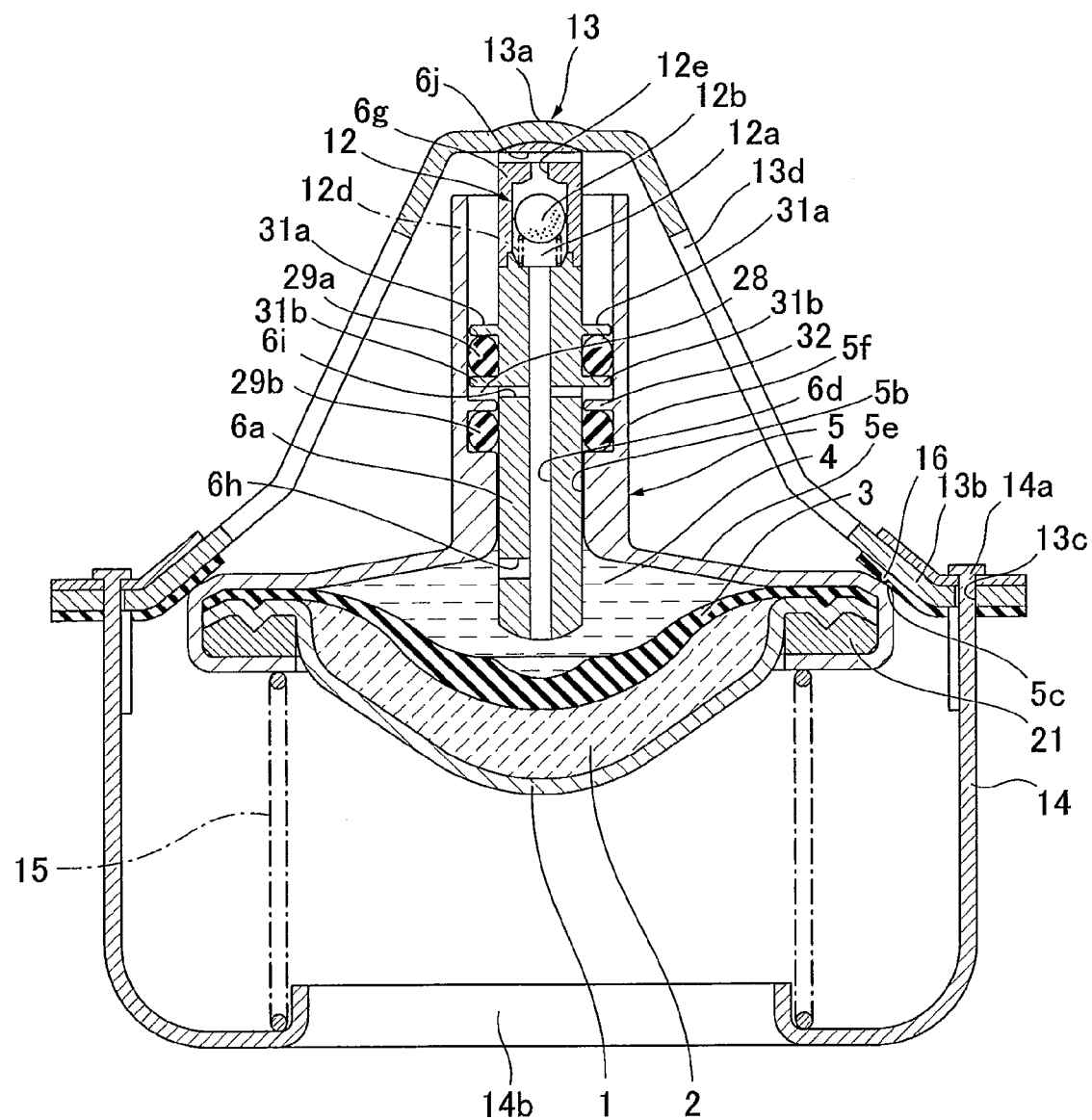
FIG. 4 is a vertical sectional view of the thermostat illustrated in FIG. 2, in a state in which a check valve is open.

FIGS. 2 to 4 are sectional views of a thermostat using a thermo-element according to a first embodiment of the present invention. FIG. 2 illustrates a closed state of a thermostat control valve, wherein a control-valve element 5c for the thermostat control valve is pressed against a control-valve seat 16 by a control-valve spring 15. FIG. 3 illustrates an opened state of the thermostat control valve, wherein a thermally expandable material 2 expands in response to an increase in ambient temperature, and thereby fluid in a liquid chamber 4 pushes up a piston 6 in relative relation with respect to a guide member 5 to open the control-valve element 5c. During operation of the thermostat, a gap between the control-value element 5c and the control-valve seat 16 is changed between the state in FIG. 2 and that in FIG. 3, so that a flow rate of fluid, such as coolant, flowing from a flow passage 14b to a flow passage 13d is controlled.

When a thermostat having a thermo-element is used, usually a frame is fixed, the position of the piston 6 is fixed, and the guide member 5 is moved relative to the piston 6. In this specification, it is explained that the piston 6 is moved relative to the guide member 5 so as to be consistent with the explanation of the thermo-element.

The thermo-element used in the thermostat illustrated in FIG. 2 will first be described in detail. The thermo-element comprises a casing 1, a thermally expandable material 2, such as wax, filled in the casing 1, a diaphragm 3 (elastic sealing member) sealingly enclosing the thermally expandable material 2 in the casing 1, a guide member 5 integral with a control-valve element 5c, and a piston 6 disposed inside the guide member 5. The piston 6 has a piston body 6a, and a piston cover 6g on top of the piston body 6a. A liquid chamber 4 is defined by a lower surface of a large-diameter portion 5e of the guide member 5, a lower surface of the piston body 6a, and an upper surface of the diaphragm 3. The thermo-element further comprises two O-rings 29a, 29b for sealing between the guide member 5 and the piston body 6a. The thermo-element further comprises a check valve 12 which includes a check-valve element 12b, a check-valve seat 12c and a check-valve spring 12d for pressing the check-valve element 12b against the check-valve seat 12c. The thermo-element further comprises a washer 21 for sealing the diaphragm 3 to the casing 1. The check valve 12 is disposed between the piston body 6a and the piston cover 6g. The structures of the check valve 12 and the piston 6 will be described later.

The liquid chamber 4 of the thermo-element is filled with the same liquid as that in which the thermo-element is immersed, and the piston 6 is adapted to be moved by this liquid. As it is only necessary to have moderate sealing performance, instead of the rubber piston 7 and the protection plate 8 used in the conventional diaphragm type thermo-element, the O-rings 29a, 29b are used. The casing 1 of the thermo-element has an outer diameter approximately equal to that of the control-valve element 5c, and a relatively thin thickness. The casing 1 has a concave-shaped central portion in which the thermally expandable material 2 is received. An outer peripheral portion of the casing 1 on an outward side of the central portion has a generally planar ring shape, and a downwardly extending protrusion is circularly formed on a central portion in the width direction of the ring-shaped outer peripheral portion. An upper side of the thermally expandable material 2 is sealingly closed by the diaphragm 3. The diaphragm 3 has an outer diameter approximately equal to that of the control-valve element 5c.

The guide member 5 has a guide tube portion 5f provided on an upper portion thereof and formed with a sliding hole 5b for slidably receiving therein the piston 6. The large-diameter portion 5e formed below the guide tube portion 5f has a diameter greater than that of the guide tube portion 5f. An outer periphery of the large-diameter portion 5e is formed as the control-valve element 5c for a thermostat control valve. In other words, the guide member 5 and the control-valve element 5c for the thermostat control valve are integrated together. The ring-shaped washer 21 is in contact with a lower surface of the outer peripheral portion of the casing 1. A circular depression for receiving therein the protrusion of the casing 1 is formed in a radially central region of the ring-shaped washer 21.

An outer peripheral edge portion of the control-valve element 5c of the guide member 5 is bent downwardly and then bent inwardly so as to be wrapped around an outer peripheral edge portion of the diaphragm 3, an outer peripheral edge portion of the casing 1 and the washer 21, and fastened thereto to prevent the thermally expandable material 2 and the fluid in the liquid chamber 4 from leaking.

Figure 5:
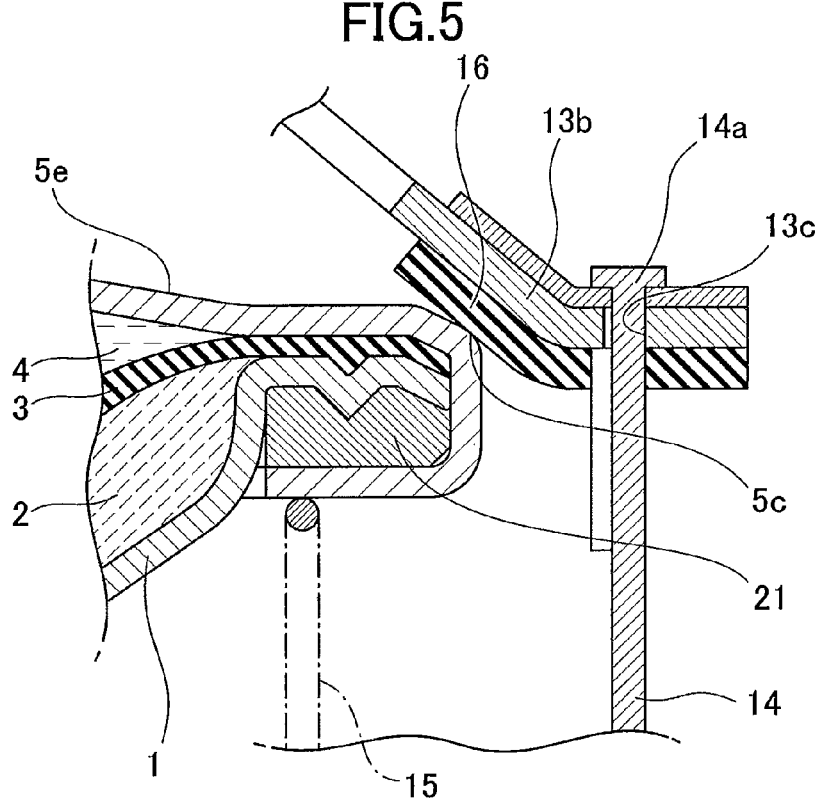
FIG. 5 is an enlarged sectional view of an edge portion of a diaphragm in the thermo-element illustrated in FIG. 2.

FIG. 5 is an enlarged sectional view of a sealing region of the diaphragm 3. Each of the outer peripheral edge portion of the diaphragm 3 and the outer peripheral edge portion of the casing 1 extends to an inside portion of the outer peripheral edge portion of the control-valve element 5c of the guide member 5.

Figure 6:
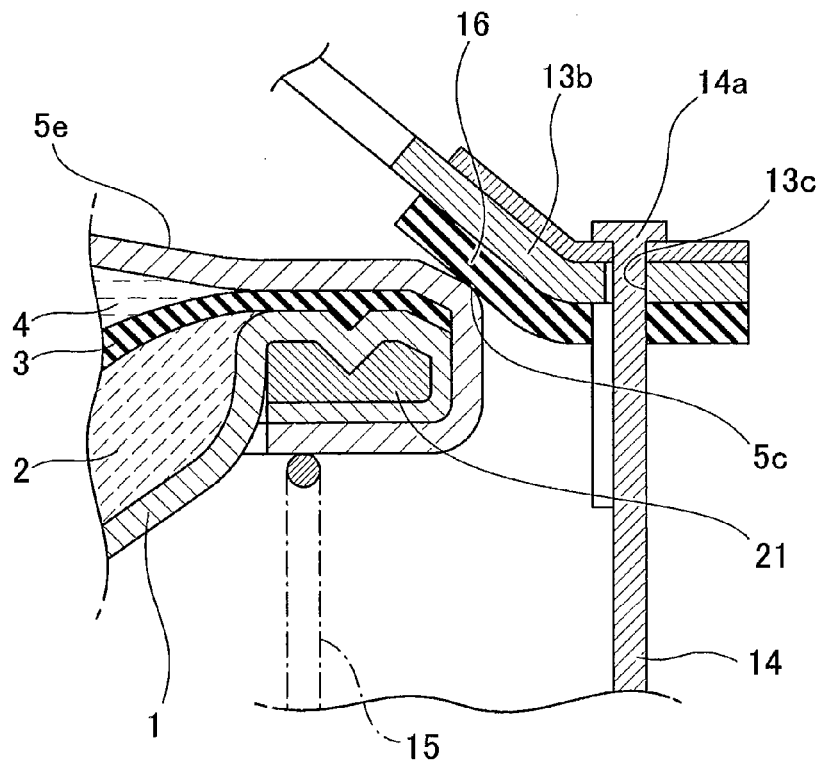
FIG. 6 is an enlarged sectional view of an edge portion of a diaphragm in the thermo-element illustrated in FIG. 2, wherein the edge portion of the diaphragm is extended to a lower surface of a washer.

In a modification illustrated in FIG. 6, the outer peripheral edge portion of the casing 1 is further extended to a lower side of the washer 21 This makes it possible to further enhance sealing performance.

The thermo-element comprises the above components.

In addition to the components of the above thermo-element, the thermostat using this thermo-element comprises a generally cylindrical-shaped lower frame 14, an upper frame 13 covering an upper region of the lower frame 14, a control-valve spring 15 for pressing the thermo-element against the upper frame 13, and a control-valve seat 16 adapted to come into contact with the control-valve element 5c. The lower frame 14 has a flow passage 14b formed as a large circular opening having a center on an central axis of the thermo-element or thermostat, and a plurality of fitting claws 14a formed on an outer periphery thereof and adapted to be fittingly engaged with the upper frame 13.

The upper frame 13 on top of the lower frame 14 has a central portion formed as a support point 13a in contact with the piston 6. The upper frame 13 has a plurality of fitting holes 13c formed in an outer periphery thereof and adapted to be fittingly engaged with the fitting claws 14a of the lower frame 14. The upper frame 13 and the lower frame 14 are integrally coupled together by fittingly engaging the fitting claws 14a with respective ones of the fitting holes 13c. Further, the upper frame 13 has a control-valve seat portion 13b formed along the outer periphery thereof and adapted to come into contact with the control-valve element 5c, and a flow passage 13d formed between the support point 13a and the control-valve seat portion 13b, as a large opening oriented obliquely upwardly. The valve seat 16 is composed of an elastic body and adhered to the control-valve seat portion 13b. A combination of the control-valve seat 16 and the control-valve element 5c formed by the outer periphery of the large-diameter portion 5e of the guide member 5 makes up the thermostat control valve.

In the first embodiment, instead of the rubber piston 7 and the protection plate 8, the O-rings 29a, 29b are used for sealing. Therefore, the piston 6 can be slidingly moved smoothly.

The check valve 12 is provided in the piston 6. Thus, when the fluid in the liquid chamber 4 decreases, the check valve 12 is opened so as to automatically supply supplementary fluid from outside the thermo-element.

The fluid in the liquid chamber 4 is the same liquid as that outside or surrounding the thermo-element, so that it has better fluidity than that of a gum-like fluid. Therefore, even if a diameter of the liquid chamber 4 is increased, the pressing force of the fluid can be sufficiently transferred to the piston 6 at a center of the liquid chamber 4, so that it becomes possible to use a casing 1 having a large diameter almost equal to an outer diameter of the control-valve element 5c. Thus, even if the thermally expandable material 2 has a relatively short axial length, and a movement of the diaphragm 3 in an up and down direction is a relatively small, the piston can be relatively moved in the up and down direction with respect to the guide member 5 by a sufficient distance.

As stated above, instead of a gum-like fluid, fluid with excellent fluidity is used, so that it becomes possible to ease restrictions on a shape of the liquid chamber 4, thereby allowing the thermostat to be increased in size and reduced in thickness.

Figure 7:
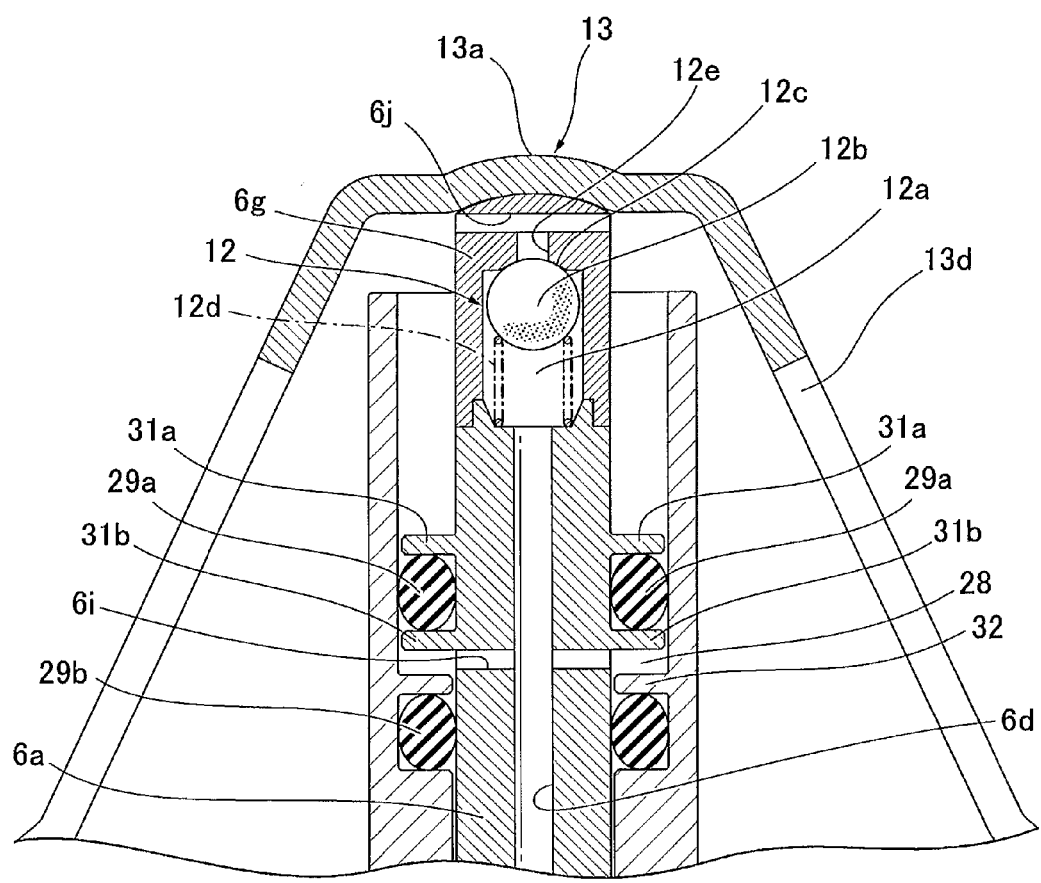
FIG. 7 is an enlarged sectional view of an upper portion of a piston in the thermostat illustrated in FIG. 2.

A structure of an upper portion of the thermo-element will be described in more detail. FIG. 7 is an enlarged sectional view of an upper portion of the piston 6. The piston cover 6g is provided on top of the piston body 6a. The check-valve element 12b of the check valve 12 is provided inside the piston cover 6g. A liquid space 28 is defined between an outer surface of the piston body 6a and an inner surface of the guide member 5, so that the fluid in the liquid chamber 4 can flow into and out of the liquid space 28.

The piston body 6a is internally formed with a through-hole 6d (FIG. 2). A lower portion of the piston 6 is formed with a radial hole 6h extending radially from the through-hole 6d and having an opening exposed to the liquid chamber 4, so that the fluid in the liquid chamber 4 can flow into and out of the through-hole 6d not only through a lower end of the through-hole 6d but also through the radial hole 6h.

The piston cover 6g is hermetically attached to an upper end face of the piston body 6a. The piston cover 6g has a bottom-opened cylindrical shape with an outer diameter equal to that of the piston body 6a. The cylindrical-shaped piston cover 6g is internally formed with a check-valve chamber 12a for receiving therein the check-valve element 12b of the check valve 12. The piston cover 6g has a communication hole 12e provided at a center of an upper portion of the piston cover 6g. The communication hole 12e communicates with a radial hole 6j provided in the upper portion of the piston cover 6g, and the radial hole 6j has an opening exposed to an outside of the piston cover 6g (to a position outside the thermo-element and inside the upper frame 13 of the thermo-element).

The upper end face of the piston body 6a forms a bottom surface of the check-valve chamber 12a, and the through-hole 6d communicates with the bottom side of the check-valve chamber 12a. The check-valve seat 12c is provided on the upper side of the check-valve chamber 12a and around one end of the communication hole 12e. The check-valve element 12b is installed in the check-valve chamber 12a under a condition that it is pressed against the check-valve seat 12c by the check-valve spring 12d. One end of the check-valve spring 12d is in contact with the upper end face of the piston body 6a.

In the first embodiment, the check-valve chamber 12a is finally defined by bringing the bottom-opened cylindrical-shaped piston cover 6g into contact with the upper end face of the piston body 6a. Alternatively, the thermo-element may be configured such that an upper portion of the piston body has a top-opened cylindrical shape, and the piston cover has a flat plate shape. In this case, the check-valve chamber can be defined by bringing the piston cover into contact with an upper end face of the upper portion of the piston body.

An upper portion of the piston body 6a is provided with two upper and lower large-diameter segments 31a, 31b. The large-diameter segments 31a, 31b are received in the sliding hole 5b of the guide member 5. A circumferential groove is defined between the large-diameter segments 31a, 31b, and the O-ring 29a is disposed in the groove. The piston body 6a is provided with a radial hole 6i extending radially from the through-hole 6d of the piston 6 and having an opening exposed to the outer peripheral surface of the piston body 6a at a position just below the lower large-diameter segment 31b. The number of the radial holes 6i may be two or more.

A lower portion of the guide tube portion 5f of the guide member 5 is increased in wall thickness, so that an inner surface of the lower portion of the guide tube portion 5f defining the sliding hole 5b is in contact with the outer surface of the piston body 6a. A circumferential groove is formed in an upper region of the inner surface of the lower portion of the guide tube portion 5f, and the O-ring 29b is disposed in the groove. Specifically, a small-diameter segment 32 is provided just above the O-ring 29b to press an upper surface of the O-ring 29b. The small-diameter segment 32 has an inner peripheral edge in contact with the outer surface of the piston body 6a. A portion of the guide tube portion 5f on an upper side of the small-diameter segment 32 is increased in inner diameter so as to receive therein the large-diameter segments 31a, 31b of the piston body 6a, and the piston cover 6g.

The liquid space 28 is defined between the lower large-diameter segment 31b of the piston body 6a and the small-diameter segment 32 of the guide member 5, and between the outer surface of the piston body 6a and the inner surface of the guide member 5. The fluid inside the liquid space 28 is hermetically sealed by the O-rings 29a, 29b so as not to leak from a gap between the guide member 5 and the piston body 6a.

When the large-diameter segment 31b of the piston body 6a is brought into contact with the small-diameter segment 32 of the guide member 5, the piston body 6a cannot be moved downwardly relative to the guide member 5 any more.

The liquid space 28 communicates with the through-hole 6d via the radial hole 6i of the piston body 6a, and then communicates with the liquid chamber 4 via the through-hole 6d. The liquid space 28 has a cross-sectional area greater than that of the piston body 6a, in a cross-section taken along a plane perpendicular to the central axis. Thus, when the liquid space 28 is filled with the fluid, a force for pushing up the piston becomes larger, so as to stabilize a movement of the piston 6.

Liquid (coolant) outside or surrounding the thermostat is used as the fluid in the liquid chamber 4. Thus, the fluid in the liquid chamber 4 has excellent fluidity, so that it can flow into the liquid space 28 via the through-hole 6d and the radial hole 6i of the piston body 6a, and then can flow back to the liquid chamber 4.

Upon an increase in ambient temperature, the thermally expandable material 2 expands, so that the diaphragm 3 is moved upwardly to push up a lower end portion of the piston body 6a through the fluid in the liquid chamber 4, as illustrated in FIG. 3. Concurrently, the fluid in the liquid chamber 4 flows into the liquid space 28 via the through-hole 6d and the radial hole 6i, to push up the large-diameter segment 31b and push down the small-diameter segment 32 of the guide member 5, so that a vertical length of the liquid space 28 is increased, and thereby the piston body 6a is moved upwardly against the control-valve spring 15 (the guide member 5 is moved downwardly). Consequently, the control-valve element 5c for the thermostat control valve is opened.

Subsequently, upon a decrease in ambient temperature, the thermostat is returned to the state illustrated in FIG. 2. Specifically, the thermally expandable material 2 contracts, so that the diaphragm 3 is moved downwardly, so that the fluid filled in the liquid space 28 is returned to the liquid chamber 4 via the radial hole 6i and the through-hole 6d of the piston body 6a, and thereby the vertical length of the liquid space 28 is reduced. Thus, the piston 6 moved upwardly with respect to the guide member 5 is returned downwardly (the guide member 5 is returned upwardly). The control-valve element 5c for the thermostat control valve is pushed back by the control-valve spring 15, and closed. When the large-diameter segment 31b of the piston body 6a is brought into contact with the small-diameter segment 32 of the guide member 5, the piston body 6a cannot be moved downwardly any more.

When the temperature further decreases, the liquid chamber 4 has a negative pressure, and no load is applied to the piston 6. Thus, as illustrated in FIG. 4, the check-valve element 12b of the check valve 12 is moved away from the check-valve seat 12c against a pressing force of the check-valve spring 12d, so that the check valve 12 is opened. Thus, the liquid surrounding the thermo-element is sucked into the liquid chamber 4 via the radial hole 6j, the communication hole 12e, the check-valve chamber 12a and the through-hole 6d to supply supplementary fluid (liquid) to the liquid chamber 4.

In the first embodiment, the fluid, such as coolant, filled in the liquid chamber 4 has fluidity better than that of a gum-like fluid. Thus, the fluid in the liquid chamber 4 can flow into the liquid space 28 of the guide member 5 via the through-hole 6d and the radial hole 6i. In other words, the fluid in the liquid chamber 4 can flow into the liquid space 28 via a bent flow path to push up the piston 6 by a strong pressure.

FIG. 8 is an enlarged sectional view of a lower portion of the piston body 6a and a central portion of the diaphragm 3. The diaphragm 3 is formed such that a thickness thereof gradually increases in a direction from an outer periphery to a center thereof to prevent abnormal deformation thereof due to a lower end portion of the piston body 6a. The central portion of the diaphragm 3 is formed with a depression for receiving therein the lower end portion of the piston body 6a. No member is interposed between the lower end portion of the piston body 6a and the central portion of the diaphragm 3. Thus, if the piston body 6a is moved downwardly, the lower end portion of the piston body 6a is brought into direct contact with the central portion of the diaphragm 3.

FIG. 9 is an enlarged sectional view of a lower portion of a piston body 6a and a central portion of a diaphragm 3 in a thermo-element according to a second embodiment of the present invention. In the second embodiment, a protection plate 22 is used to prevent the diaphragm 3 from being deformed by the lower portion of the piston body 6a. The remaining structure is the same as that of the thermo-element according to the first embodiment, except for the following points.

In the second embodiment, a thickness of the diaphragm 3 is approximately constant, and the depression in the first embodiment for receiving therein the lower end portion of the piston body 6a is not formed. The protection plate 22 for protecting the diaphragm 3 is interposed between the lower end portion of the piston body 6a and the central portion of the diaphragm 3. The protection plate 22 is made of a material less likely to undergo deformation, and formed in a generally circular disk shape, wherein a depression for receiving therein the lower end portion of the piston body 6a is formed in a central region of an upper surface thereof, and a lower surface thereof has a shape conforming to that of an upper surface of the diaphragm 3.

If the lower end portion of the piston body 6a is brought into direct contact with the diaphragm 3 as illustrated in FIG. 8, an excessive force is applied to the diaphragm 3, which is likely to cause abnormal deformation. When the protection plate 22 is used as illustrated in FIG. 9, the diaphragm 3 is not subject to abnormal deformation. Even if the lower end of the through-hole 6d is closed by the protection plate 22, the fluid in the liquid chamber 4 can flow in and out of the through-hole 6d via the radial hole 6h.

It is to be understood that the protection plate 22 is optional and omittable.

The first and second embodiments have been described based on an example in which the thermo-element of the present invention is installed in a thermostat for an automobile. Alternatively, the thermo-element of the present invention may be installed in any other suitable device to obtain the same advantageous effects.

The first and second embodiments of the present invention have been described primarily based on the diaphragm type thermo-element. But, the present invention is not limited to the diaphragm type. That is, it may also be applied to a sleeve type adapted to push a piston through incompressible fluid.

What is claimed is:

1. A thermo-element comprising:
   a casing having a bottom;
   a thermally expandable material filled in the casing, the thermally expandable material including paraffin capable of expanding and contracting due to temperature changes;
   an elastic sealing member sealingly enclosing the thermally expandable material in the casing;
   a piston movable in an axial direction thereof;
   a guide member fixed to an upper portion of the casing and formed with a sliding hole for slidably holding the piston;
   a liquid chamber defined internally by the elastic sealing member, the guide member and the piston; and
   a deformable, incompressible fluid received in the liquid chamber,
   wherein the piston is adapted to be moved along the sliding hole of the guide member in the axial direction, according to expansion and contraction of the thermally expandable material and through the incompressible fluid in the liquid chamber,
   the thermo-element being characterized in that the piston is internally formed with:
   a through-hole communicating with the liquid chamber;
   a check-valve chamber communicating with the through-hole and receiving therein a check-valve element of a check valve; and
   a communication hole communicating with the check-valve chamber and having an opening exposed to an outside of the thermo-element.

2. The thermo-element as defined in claim 1, wherein the piston has a piston body and a piston cover disposed at one end of the piston body, and wherein the check-valve chamber is defined between the piston body and the piston cover.

3. The thermo-element as defined in claim 2, wherein the check-valve element in the check-valve chamber is pressed against a check-valve seat formed on an inner surface of the piston cover, by a check-valve spring.

4. The thermo-element as defined in claim 1, which further comprises a protection plate disposed between a lower end portion of the piston and an upper surface of a central portion of the elastic sealing member to protect it against the lower end portion of the piston.

5. The thermo-element as defined in claim 1, which further comprises a hermetic liquid space defined between an outer peripheral surface of the piston and an inner peripheral surface of the guide member, the liquid space communicating with the liquid chamber via the through-hole of the piston, whereby the incompressible fluid in the liquid chamber can flow into and out of the liquid space according to expansion and contraction of the thermally expandable material.

6. The thermo-element as defined in claim 5, wherein the liquid space is hermetically held by O-rings disposed between the outer peripheral surface of the piston and the inner peripheral surface of the guide member.

7. A thermostat comprising:
   a thermo-element which has a casing having a bottom, a thermally expandable material filled in the casing and including paraffin capable of expanding and contracting due to temperature changes, an elastic sealing member sealingly enclosing the thermally expandable material in the casing, a piston movable in an axial direction thereof, a guide member fixed to an upper portion of the casing, a liquid chamber defined internally by the elastic sealing member, the guide member and the piston, and a deformable, incompressible fluid received in the liquid chamber,
   wherein the guide member has a guide tube portion formed with a sliding hole for slidably holding the piston, a large-diameter portion formed below the guide tube portion to have an outer diameter greater than that of the guide tube portion, and a control-valve element formed by an outer periphery of the large-diameter portion;
   a lower frame for receiving therein the thermo-element, the lower frame being formed with a flow passage for allowing liquid to pass therethrough;
   an upper frame fixed to the lower frame and formed with a flow passage for allowing the liquid to pass therethrough, the upper frame having a top portion in contact with an upper end portion of the piston, and a control-valve seat adapted to come into contact with the control-valve element of the thermo-element; and
   a control-valve spring for pressing the control-valve element of the thermo-element against the control-valve seat of the upper frame, wherein the piston is adapted to be relatively moved with respect to the guide member in the axial direction along the sliding hole, according to expansion and contraction of the thermally expandable material and through the incompressible fluid in the liquid chamber, so that a distal end of the upper end portion of the piston pushes up an upper portion of the upper frame in relative relation with respect to the guide member, thereby opening the control-valve element, the thermostat being characterized in that the piston is internally formed with: a through-hole communicating with the liquid chamber; a check-valve chamber communicating with the through-hole and receiving therein a check-valve element of a check valve; and a communication hole communicating with the check-valve chamber and having an opening exposed to an outside of the thermo-element, the check valve being operable to permit a flow of the incompressible fluid in a direction from the communication hole to the liquid chamber, and inhibit a flow of the incompressible fluid in a direction from the liquid chamber to the communication hole.

8. The thermostat as defined in claim 7, wherein the large-diameter portion of the guide member has an outer edge region which is bent downwardly and then further bent inwardly so as to hermetically seal between the casing and the elastic sealing member through a washer.

* * * * *

UNITED STATES PATENT AND TRADEMARK OFFICE
CERTIFICATE OF CORRECTION

| | | |
|---|---|---|
| PATENT NO. | : 8,544,762 B1 | Page 1 of 1 |
| APPLICATION NO. | : 13/618559 | |
| DATED | : October 1, 2013 | |
| INVENTOR(S) | : Yukio Onishi | |

It is certified that error appears in the above-identified patent and that said Letters Patent is hereby corrected as shown below:

On the Title Page

Left column, insert a new item as follows:

--(65)        Prior Publication Data

US 2013/0264392 A1        October 10, 2013--.

Signed and Sealed this
First Day of April, 2014

Michelle K. Lee
*Deputy Director of the United States Patent and Trademark Office*